(12) United States Patent
Mach et al.

(10) Patent No.: US 8,942,205 B2
(45) Date of Patent: Jan. 27, 2015

(54) PERFORMING IDLE MODE MOBILITY MEASUREMENTS IN A MOBILE COMMUNICATION NETWORK

(75) Inventors: Tomasz Henryk Mach, Fleet (GB); Richard Charles Burbidge, Hook (GB); Johanna Lisa Dwyer, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 160 days.

(21) Appl. No.: 13/357,409

(22) Filed: Jan. 24, 2012

(65) Prior Publication Data

US 2013/0188499 A1 Jul. 25, 2013

(51) Int. Cl.
*H04W 4/00* (2009.01)
*H04L 12/28* (2006.01)

(52) U.S. Cl.
USPC .......................................... 370/331; 370/252

(58) Field of Classification Search
USPC .......................... 370/252, 310–350, 464–465
See application file for complete search history.

(56) References Cited

U.S. PATENT DOCUMENTS

| | | | | |
|---|---|---|---|---|
| 8,229,432 B2* | 7/2012 | Fox et al. | .................... | 455/435.3 |
| 8,249,591 B2* | 8/2012 | Tod et al. | ....................... | 455/434 |
| 8,588,773 B2* | 11/2013 | Deshpande et al. | .......... | 455/434 |
| 8,600,388 B2* | 12/2013 | Magadi Rangaiah et al. | ............................. | 455/436 |
| 8,630,216 B2* | 1/2014 | Deivasigamani et al. | .... | 370/311 |
| 8,787,915 B2* | 7/2014 | Chun et al. | ..................... | 455/436 |
| 2003/0218995 A1* | 11/2003 | Kim et al. | ...................... | 370/318 |
| 2005/0090278 A1* | 4/2005 | Jeong et al. | .................... | 455/525 |
| 2009/0181661 A1* | 7/2009 | Kitazoe et al. | ................. | 455/418 |
| 2009/0270104 A1* | 10/2009 | Du et al. | ......................... | 455/436 |
| 2010/0232301 A1* | 9/2010 | Omori | ............................. | 370/252 |
| 2010/0278146 A1* | 11/2010 | Aoyama et al. | ................ | 370/331 |
| 2011/0207453 A1* | 8/2011 | Hsu et al. | ........................ | 455/424 |
| 2011/0222459 A1* | 9/2011 | Kim | ................................ | 370/312 |
| 2011/0236230 A1* | 9/2011 | Ikegawa et al. | ................ | 417/316 |
| 2011/0263260 A1* | 10/2011 | Yavuz et al. | ................... | 455/437 |
| 2012/0236751 A1* | 9/2012 | Lee et al. | ....................... | 370/252 |
| 2012/0275371 A1* | 11/2012 | Somasundaram et al. | ..... | 370/312 |
| 2013/0010631 A1* | 1/2013 | Jung et al. | ...................... | 370/252 |
| 2013/0077515 A1* | 3/2013 | Jung et al. | ...................... | 370/252 |
| 2013/0103934 A1* | 4/2013 | Hashioka et al. | ................. | 713/1 |
| 2013/0148534 A1* | 6/2013 | Jung et al. | ...................... | 370/252 |

(Continued)

FOREIGN PATENT DOCUMENTS

WO 2005/109687 11/2005
WO 2008/112255 9/2008

(Continued)

OTHER PUBLICATIONS

3GPP TS 25215 V11.0.0 (Dec. 2011).

(Continued)

*Primary Examiner* — Warner Wong
(74) *Attorney, Agent, or Firm* — Fish & Richardson P.C.

(57) ABSTRACT

Methods, apparatus and articles of manufacture for performing idle mode mobility measurements in a mobile network are disclosed. An example method in a user equipment (UE) disclosed herein comprises receiving, from the mobile network, a system information block (SIB) message specifying idle mode mobility measurement is to be performed. If the measurement parameter threshold is not configured in the SIB message or if the SIB message includes an indication to not use a configured measurement parameter threshold in the SIB message, the UE sets a measurement parameter threshold for idle mode mobility measurement.

30 Claims, 8 Drawing Sheets

(56) References Cited

U.S. PATENT DOCUMENTS

| | | | |
|---|---|---|---|
| 2013/0217394 A1* | 8/2013 | KIM et al. ............... | 455/436 |
| 2013/0223235 A1* | 8/2013 | Hu et al. ............... | 370/242 |
| 2013/0223267 A1* | 8/2013 | Jung et al. ............... | 370/252 |
| 2013/0223268 A1* | 8/2013 | Jung et al. ............... | 370/252 |
| 2013/0229938 A1* | 9/2013 | Jung et al. ............... | 370/252 |
| 2013/0235738 A1* | 9/2013 | Siomina et al. ............... | 370/252 |
| 2014/0112180 A1* | 4/2014 | Axmon et al. ............... | 370/252 |

FOREIGN PATENT DOCUMENTS

| | | |
|---|---|---|
| WO | 2009/144501 | 12/2009 |
| WO | 2011/162881 | 12/2011 |
| WO | 2012/008957 | 1/2012 |

OTHER PUBLICATIONS

3GPP TS 25.304 V10.2.0 (Sep. 2011) Relevant Section 5.2.6.1.1 "Measurement rules for cell re-selection when HCS is not used".

3GPP TS 25331 v10.5.0 (Sep. 2011) Relevant Section 7 "Protocol States".

3GPP TR 36902 V9.3.1 (Mar. 2011).

3GPP TS 32521 V10.1.0 (Dec. 2010).

3GPP TS 36304 V10.3.0 (Sep. 2011) Relevant Section 5.2.4.2 "Measurement rules for cell re-selection".

"3GPP Standard; 3GPP TS 36.304, No. V9.4.0, 3rd Generation Partnership Project; Technical Specification Group Radio Access Network; Evolved Universal Terrestrial Radio Access (E-UTRA); User Equipment (UE) procedures in idle mode (Release 9)", Oct. 11, 2010.

International Search Report and Written Opinion of the International Searching Authority issued in International Application No. PCT/EP2013/051388 on Sep. 9, 2013.

International Preliminary Report on Patentability issued in International Application No. PCT/EP2013/051388 on Jul. 29, 2014.

Extended European Search Report issued in EP Application No. 12152338.5 on Jul. 30, 2012.

\* cited by examiner

PERFORMING IDLE MODE MOBILITY MEASUREMENTS IN A MOBILE COMMUNICATION NETWORK

FIELD OF THE DISCLOSURE

This disclosure relates generally to mobile communication networks and, more particularly, to performing idle mode mobility measurements in a mobile communication network.

BACKGROUND

In many mobile networks, after a user equipment (UE) has selected a public land mobile network (PLMN) for mobile communication service, the UE periodically monitors the performance of its current serving cell when in idle mode of operation (there is no active radio connection with a mobile network). The UE in idle mode also regularly verifies if there is a neighbor cell that can provide better service quality while maintaining service continuity for the UE. When a better cell is identified, a cell re-selection procedure is typically launched to allow the UE to camp on the better suitable cell from its current serving cell.

In existing mobile networks, a cell re-selection procedure is determined by parameters in system information block (SIB) messages broadcasted by the radio access network (RAN) within each cell. A UE performs idle mode mobility measurements using the criteria set in the SIB message. The UE launches idle mode mobility measurements when certain parameter of the serving cell is below or equal to a predetermined threshold set in the SIB message. The idle mode mobility measurements proceed until cell re-selection takes place in the UE.

In some existing mobile networks, the settings of the idle mode mobility measurement parameter thresholds in the SIB messages are mostly static parameters on a per cell basis, not adapted for the optimal cell performance. As a result, the measurement threshold settings in the SIB message may lead to excessive current consumption in a UE and significantly shorten the UE battery life in idle mode if the threshold is set too high. The consequence of the threshold being set too low could be a decreased average serving cell quality, delayed re-selection to a neighbor cell, and an increased likehood of UE being unreachable for paging (UE going out of service). In some other existing mobile networks, the measurement parameters are unspecified or threshold values not configured, which requires the UE to perform mobility measurements all the time during idle mode.

Additionally, a measurement threshold in existing mobile networks is usually manually set by a network operator on a per cell basis. The network operators need to perform time-consuming and costly field test to adjust and optimize the network measurement parameters. As the mobile communication technology evolves, the provision of self-optimizing networks (SON) is becoming a high priority for network operators to derive the optimal performance from the network in an automated and cost-effective manner. This may be contributively achieved through changing the existing ways network measurements are performed.

DETAILED DESCRIPTION

Figure 1:
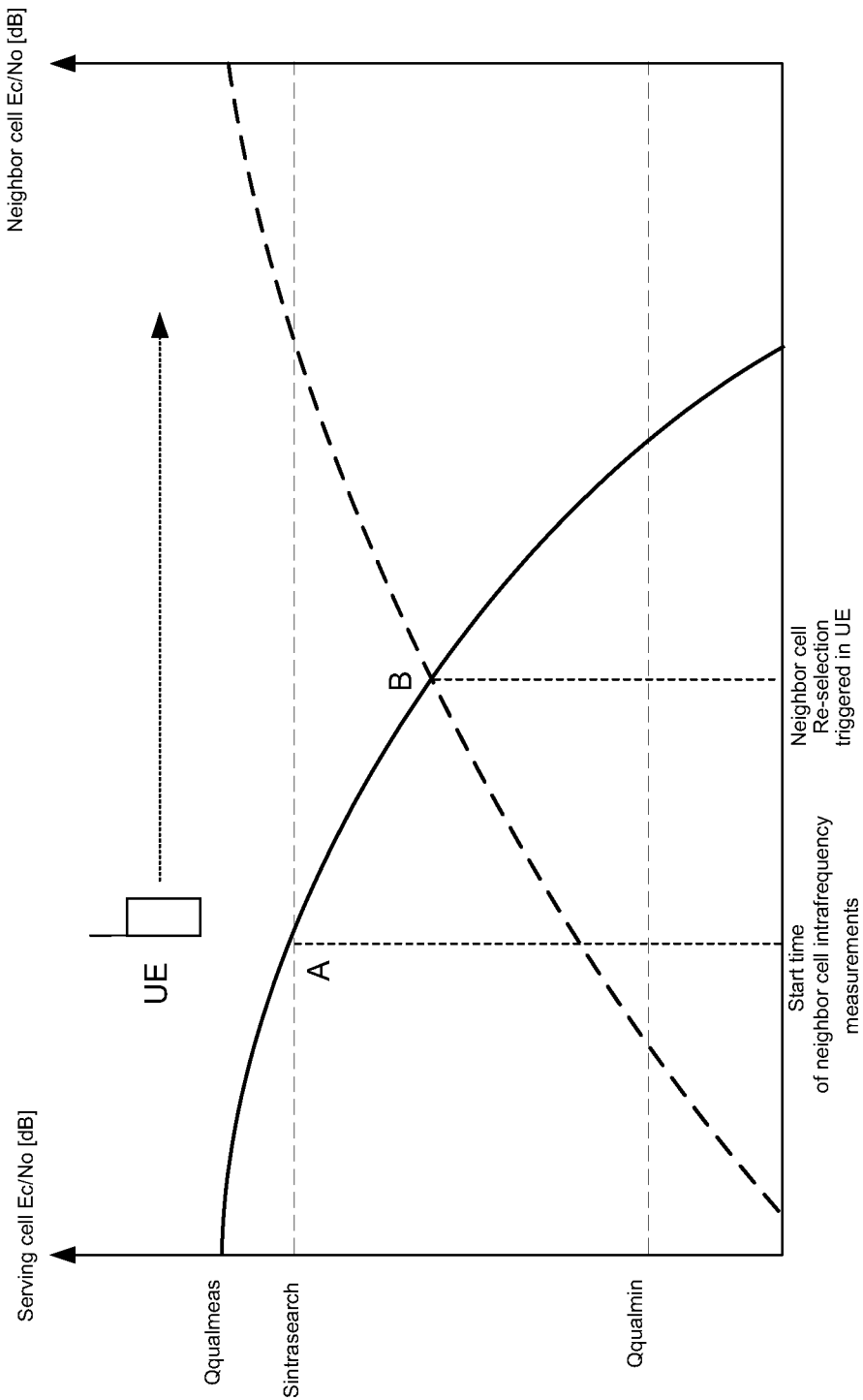
FIG. 1 illustrates an existing UE idle mode neighbor cell measurement and the corresponding measurement parameters.

Methods, apparatus and articles of manufacture for performing idle mode mobility measurements in a mobile network are disclosed herein. In an example method disclosed herein, an example user equipment (UE) camps on a cell after the UE has selected an example mobile communication network, such as a public land mobile network (PLMN), for mobile communication service. An example mobile communication network may be an existing or future mobile network that is compliant with the Third Generation Partnership Project (3GPP) specifications. The UE performs idle mode mobility measurement after having camped on the cell (referred to as serving cell) for a short period. In one example, in SIB messages a UE received from the mobile network, the mobile network does not configure measurement parameter thresholds for UE idle mode mobility measurements. In another example, a SIB message a UE received from the mobile network includes an indication that permits a UE to perform idle mode mobility measurements using UE-configured measurement parameter thresholds. The indication may include a flag set in one or more SIB messages broadcasted by the radio access network within the serving cell. The indication may be a result of the mobile network determining that application of the UE's internal algorithm to set the idle mode mobility measurement thresholds will have little impact to the average serving cell quality. In above or other scenarios, the UE configures one or more idle mode mobility measurement thresholds through executing one or more internal processes (e.g., machine readable instructions embedded) in the UE.

In another example, a UE comprises a measurement system that may be configured to perform idle mode mobility measurements when measurement parameter thresholds are not configured in one or more SIB messages from the network. The measurement system includes a measurement controller that may be configured to measure cell quality parameters on serving cells at a plurality of prior neighbor cell re-selections, a storage that may be configured to save the measured serving cell quality parameters, and a processor that may be configured to calculate a threshold from the prior serving cell quality parameters saved in the storage via UE's internal processes. The calculated threshold may then be used as threshold for subsequent idle mode mobility measurements.

In a further example, a non-transitory machine-readable medium comprises coded machine-readable instructions. The execution of the machine-executable instructions is for a UE to perform idle mode mobility measurements when a SIB message the UE received from a mobile network does not configure measurement parameter thresholds for UE idle mode mobility measurements. The machine-executable instructions may comprise an algorithm for setting an allowed maximum value of a measurement parameter as an initial measurement parameter threshold for subsequent idle mode mobility measurement. The machine-executable instructions may also comprise one or more algorithms for measuring cell quality parameters on serving cells at a plurality of prior neighbor cell re-selections, for saving the measured serving cell quality parameters in a local storage, for calculating an updated measurement parameter threshold from the saved serving cell quality parameters via one or more internal processes, and for setting the updated threshold as the measurement parameter threshold for subsequent idle mode mobility measurements.

A mobile communication network typically includes two major parts, a radio access network component (RAN) and a core network component (CN). A radio access network usually resides between wireless user equipments (UE) and the core network to provide to UEs access to voice, data or other communication services provided by the core network. A UE is also variably referred to as a mobile station (MS), a mobile device, a portable device, a user terminal, a terminal equipment and the like. The core network may be further connected to an external data network such as the public internet. An example mobile communication network may be an existing network that is compliant with the Third Generation Partnership Project (3GPP) specifications, such as a 2G Global System for Mobile communications (GSM) network, a 3G Universal Mobile Telecommunications System (UMTS) network, and a 4G Long-Term Evolution (LTE) network.

During normal operation, mobile devices typically form a long-term attachment with the core network by means of establishing a user context within one or more core network nodes. The user context is used by the core network to route inbound and outbound massages between a gateway CN node and a serving CN node to which the UE is attached. As an example, a UE is attached to the core network of a GSM network through a GPRS EDGE radio access network (GERAN) (GPRS refers to the general packet radio service, EDGE refers to enhanced data rates for GSM evolution.) In another example, a UE is attached to the core network of an UMTS network through a universal terrestrial radio access network (UTRAN). As a further example, a UE is attached to the evolved packet core (EPC) of an LTE network through an evolved universal terrestrial radio access network (E-UTRAN). When a UE is attached to a mobile network, connectivity of the UE with the RAN and connectivity of the RAN with the CN may be non-continuous in order to save UE battery power and network transmission resources during periods when data activity is low. A Radio Resource Control (RRC) layer (L3) protocol resident within a RAN node (such as the Radio Network Controller—RNC—for UMTS, or the eNodeB—eNB—in LTE) is often used to control the level of connectivity provided between the UE and the RAN, and between the RAN and the CN.

For example, in the context of a UMTS network, five RRC states are defined to represent the level of connectivity between a UE, the UTRAN, and the core network. Four out of the five RRC states are categorized as "RRC Connected" mode in which connectivity is established between the UTRAN and the CN for the UE. The remaining state is categorized as "Idle" mode in which the UE is not connected to the UTRAN and to the CN. The five UMTS RRC states are listed below in an order of a decreasing level of connectivity:

Cell_DCH state (RRC Connected Mode): In this state, full user-plane connectivity is established between the UE and the core network (through the radio access network). All associated bearers are established between the UE and the plurality of involved network nodes within the connection path (e.g. Uu, Iub, Iu, Gn, Gi interfaces). The UE has near-immediate access to dedicated or shared radio resources. The location of the UE is known to the cell level by the radio access network, and the network is in control of cell-level mobility (known as network-controlled handover). UE power consumption in this state is relatively high.

Cell_FACH state (RRC Connected Mode): In this state, a low level of user-plane connectivity is possible using small amount of shared or common radio resources. Associated bearers remain established between the UE and the plurality of involved network nodes within the connection path. The location of the UE is known to the cell level but the UE is able to autonomously control its cell-level mobility (known as cell re-selection). A DRX pattern may be employed to assist with power saving (DRX refers to discontinuous reception in which predetermined cyclic period of "on" and "off" periods are configured for a UE receiver. During a DRX "on" period, a UE reception of paging and control channel messages is attainable).

Cell_PCH state (RRC Connected Mode): In this state, while the necessary bearers for user-plane communications through the radio access network remain established, no radio resources are available for data transfer. As such, there is no data activity in this state; user-plane communication requires a transition to either cell_FACH or cell_DCH. In cell_PCH, the UE periodically listens to a paging channel (according to a known DRX cycle) such that it may receive notifications of a need to transition to a more active state while saving as much power as possible. The location of the UE is known to cell level, and mobility is autonomously controlled by the UE.

URA_PCH state (RRC Connected Mode): This state is substantially the same as cell_PCH except that the location of the mobile is known only to a (typically large) group of cells known as a routing area. Mobility remains autonomously controlled by the UE. Significant power savings (on top of those achievable in cell_PCH) are possible in this state due to the fact that the UE only needs to inform the network of a location update for each new routing area (rather than a location update each time a new cell is entered).

Idle state: In this state, a UE is registered to a UMTS network, but not actually active. The user-plane connectivity is not established. No resources are assigned to the UE and a DRX pattern is used in order to conserve power. User-plane connectivity between the radio access network and the core network is not required; hence Uu, Iub and Iu interfaces are not established. The UE camps on a UTRAN cell and retains an attachment context with the core network such as to facilitate "always-on" connectivity (i.e. the device is reachable and its IP address is preserved), even when in idle mode. The core network tracks the location of the UE to routing area level. User-plane communication requires re-establishment of the necessary radio and access bearers and a transition to either cell_FACH or cell_DCH state. (Generally, the term "radio bearer" refers to radio resources (e.g. radio channels) assigned to the UE and the network for the transfer of user or control data with a defined Quality of Service (QoS). And, the term "access bearer" refers to radio resources assigned between the UE and a node in the access network).

Details of UMTS RCC terminal states and transitions are described in 3GPP Technical Specification 3GPP TS 25.331, Radio Resource Control Protocol specification, v10.5.0, September 2011, which is herein incorporated by reference in its entirety.

For example, in the context of an LTE network, two RRC states are defined to represent the level of connectivity between a UE, the E-UTRAN, and the core network (also known as EPC). One state is categorized as "E-UTRA RRC Connected" mode in which connectivity is established between the E-UTRAN and the EPC for the UE. The other state is categorized as "E-UTRA RRC Idle" mode in which the UE is not connected to the E-UTRAN and to the EPC. The two LTE RRC states are listed below:

E-UTRA RRC Connected Mode: In this state, full user-plane connectivity is established between the UE and the core network (through the radio access network). All associated bearers are established between the UE and the plurality of involved network nodes within the connection path (e.g. Uu, S1, S5/S7 interfaces). The UE has near-immediate access to dedicated or shared radio resources. The location of the UE is known to the cell level by the radio access network, and the network is in control of cell-level mobility (known as network-controlled handover). UE power consumption in this state may be relatively high.

E-UTRA RRC Idle Mode: In this state, a UE is registered to an LTE network, but not actually active. The user-plane connectivity is not established. No resources are assigned to the UE; an idle-mode DRX pattern is used in order to conserve power. User-plane connectivity between the radio access network and the core network is not required; hence Uu, S1 and S5/S7 interfaces are not established. The UE camps on an E-UTRAN cell and retains an attachment context with the core network such as to facilitate "always-on" connectivity (i.e. the device is reachable and its IP address is preserved), even when in idle mode. The location of the mobile is known by the CN to the tracking area level; but the UE is able to autonomously control its cell-level mobility (known as cell re-selection). The UE updates the CN whenever it camps on a cell located within a new tracking area. User-plane communication requires re-establishment of the necessary radio and access bearers and a transition to the "E-UTRA RRC Connected Mode" state.

Details of LTE RRC terminal states and transitions are described in 3GPP Technical Specification 3GPP TS 25.331, Radio Resource Control Protocol specification, v10.5.0, September 2011, which is herein incorporated by reference in its entirety.

After a UE has selected a PLMN, it performs typical idle mode operations: performs cell selection to search for a suitable cell (i.e., serving cell) on which to camp, acquires SIB messages for parameters configured for cell selection/re-selection operations, performs cell re-selection after the UE camps on a serving cell, and monitors a paging channel to detect incoming calls. The UE may subsequently establish an RRC connection with the network, for example, to establish a call or transfer data.

In the context of 3GPP RATS (i.e., GERAN, UTRAN, and E-UTRAN), idle mode cell selection and re-selection operations are generally performed after a UE has camped on a serving cell. These operations aim to place the UE to a cell in the selected PLMN and its equivalent PLMNs that provides the "best" quality of service. The operations typically comprise a number of common stages that are broadly the same regardless of the RAT involved. Each of these common stages constitutes a decision point, either in the UE or in the network. In an initial stage, serving cell quality is monitored and evaluated on a periodic basis. If the serving cell quality is satisfactory (i.e., above a threshold configured by the network), then no further action is needed. However, if the serving cell quality is below the configured threshold, cell re-selection is performed in subsequent stages. In a second stage, the UE searches for candidate neighbor cell to move to. The UE evaluates the carrier frequencies of all radio access technologies (RATs) of neighbor cells based on pre-determined priorities. For example, the UE may evaluate neighbor cells on the same frequency (intra-frequency cells) and, subsequently, neighbor cells on other frequencies (inter-frequency cells) of the same RAT in which the UE is currently operating. The UE may additionally evaluate neighbor cells of one or more other RATs (inter-RAT cells) than that the cell is currently operating. If some neighbor cells are identified, a third stage is performed. In this stage, service quality, such as signal strength and quality, for the identified neighbor cells is measured periodically. In a fourth stage, the UE compares the neighbor cells on the relevant frequencies based on a predetermined ranking criterion, such as signal strength quality and cell priority. A decision is then made by the UE on whether or not the UE should move to another serving cell.

FIG. 1 illustrates an existing procedure of neighbor cell measurement used in an idle mode cell re-selection operation in an UMTS mobile communication network. A UE is shown physically moving from a serving cell area toward a neighbor cell area. The serving cell and the neighbor cell are both UTRA FDD (frequency-division duplex) cells in an UMTS network in this example. Cell quality value parameter Qqualmeas expressed in CPICH Ec/No [dB] is measured on the UE while it moves from the serving cell area toward the neighbor cell area. CPICH stands for common pilot indicator channel in UMTS and other mobile communication systems. CPICH Ec/No is defined as the received energy per chip (Ec) on the P-CPICH (Primary CPICH) of a given cell divided by the total noise power density (No) on the UMTS carrier. CPICH Ec/No is used mainly to rank different UMTS FDD candidate cells according to their service quality and is typically used as an input for a cell re-selection decision. The detailed definition of CPICH Ec/No is described in 3GPP Technical Specification 3GPP TS 25.215, Technical Specification Group Radio Access Network Physical Layer Measurement (FDD) (Release 10). Also illustrated in FIG. 1 include cell quality parameter thresholds "Qqualmin" [dB] and "Sintrasearch" [dB]. "Qqualmin" represents the minimum required quality in the cells. "Sintrasearch" specifies the cell quality threshold (measured above "Qqualmin"), below which an intra-frequency neighbor cell measurement should be performed in a UE in order to make a cell re-selection decision. In the current example, the minimum required cell quality "Qqualmin" of the serving cell and of the neighbor are shown as the same. In other examples, "Qqualmin" of a serving cell may be different from that of a neighbor cell.

According to the 3GPP Technical Specification 3GPP TS 25.304, section 5.2.6.1.1, neighbor cell measurement criterion for cell re-selection for UMTS FDD cells is defined as the following:

If Squal>Sintrasearch, UE may choose to not perform intra-frequency measurements.

If Squal<=Sintrasearch, perform intra-frequency measurements.

If Sintrasearch is not sent for serving cell, perform intra-frequency measurements.

Where:

$$Squal\ [dB] = Qqualmeas - Qqualmin;$$

Qqualmeas—Measured cell quality value expressed in CPICH Ec/No [dB], as described above;

Qqualmin—Minimum required quality level in the cell [dB], as described above; and Sintrasearch—threshold for intra-frequency neighbor cell measurement, as described above.

The above neighbor cell measurement criterion for cell re-selection is graphically illustrated in FIG. 1. As shown in FIG. 1, intra-frequency cell measurement starts at point "A" where condition Squal<=Sintrasearch is met. UE performs intra-frequency cell measurements continuously while the UE moves from the serving cell toward the neighbor cell. Neighbor cell se-selection is triggered in UE when it reaches cross point "B" where measured cell quality "Qqualmeas" of the neighbor cell is better than that of the serving cell. In another example, measurement parameter threshold "Sintersearch" may be configured for inter-frequency neighbor cell measurements in UMTS FDD cells. The corresponding measurement criterion is described in 3GPP Technical Specification 3GPP TS 25.304. In a further example, measurement parameter threshold "Snonintrasearch" may be configured for E-UTRAN inter-frequency or inter-RAT neighbor cell measurements in an LTE network. The corresponding measurement criterion is described in 3GPP Technical Specification 3GPP TS 36.304.

In the above existing procedures of neighbor cell measurement performed in an idle mode cell re-selection operation, a few common practices are carried out in various existing networks, such as GSM, UMTS and LTE networks, regardless of the RATs involved (e.g. GERAN, UTRA, E-UTRA). Moreover, these common practices apply to the neighbor cell measurements of various types, such as, intra-frequency, inter-frequency and inter-RAT measurements. For example, measurement parameters for a cell and their corresponding measurement thresholds, such as "Sintrasearch", "Sintersearch" and "Snonintrasearch" are predetermined by the network and provided to a UE in one or more SIB messages that are broadcasted within the cell. These measurement thresholds are predominantly configured through a manual process (e.g., field test or measurements) by a network operator on a per cell basis. In an existing practice, the measurement thresholds for a certain cell are configured not too high in order to conserve UE battery life, and not too low to harm the average serving cell quality. Once the measurement thresholds are configured for the cell, their values remain unchanged regardless of the UE or cell condition changes, such as UE mobility, interference level or traffic load change in a cell. In some existing practices, network operators are commonly inclined to set measurement thresholds on the high side to secure a desirable average serving cell quality, while overlooking the reduced battery life on the UEs. In other existing practices, measurement thresholds are not configured by the network operator for some cells in a network. This may be due to the high cost associated with the current manual practice in measurement threshold setting. According to the current 3GPP Technical Specification 3GPP TS 25.304, section 5.2.6.1.1, under this scenario a UE is required to perform neighbor cell measurements all the time even if the UE is camped on a strong serving cell. User experience of shortened battery life is ignored. Additionally, as the mobile communication technology evolves, the provision of self-optimizing networks (SON) is a high priority for network operators in order to deal with the increasing complexity of network configuration and optimization. Automated processes are in rising demand to replace manual processes in performing the network configuration and optimization. The 3GPP has introduced increasing requirements for UTRAN and E-UTRAN networks to support the SON concepts. For example, the use case of automatic neighbor relation and mobility optimization are addressed in recent releases of SON. The details of SON functionality may be found in 3GPP Technical Specification 3GPP TS 36.902 (LTE standard), and 3GPP Technical Specification TS 32.521 (UMTS and LTE standards).

Figure 2:
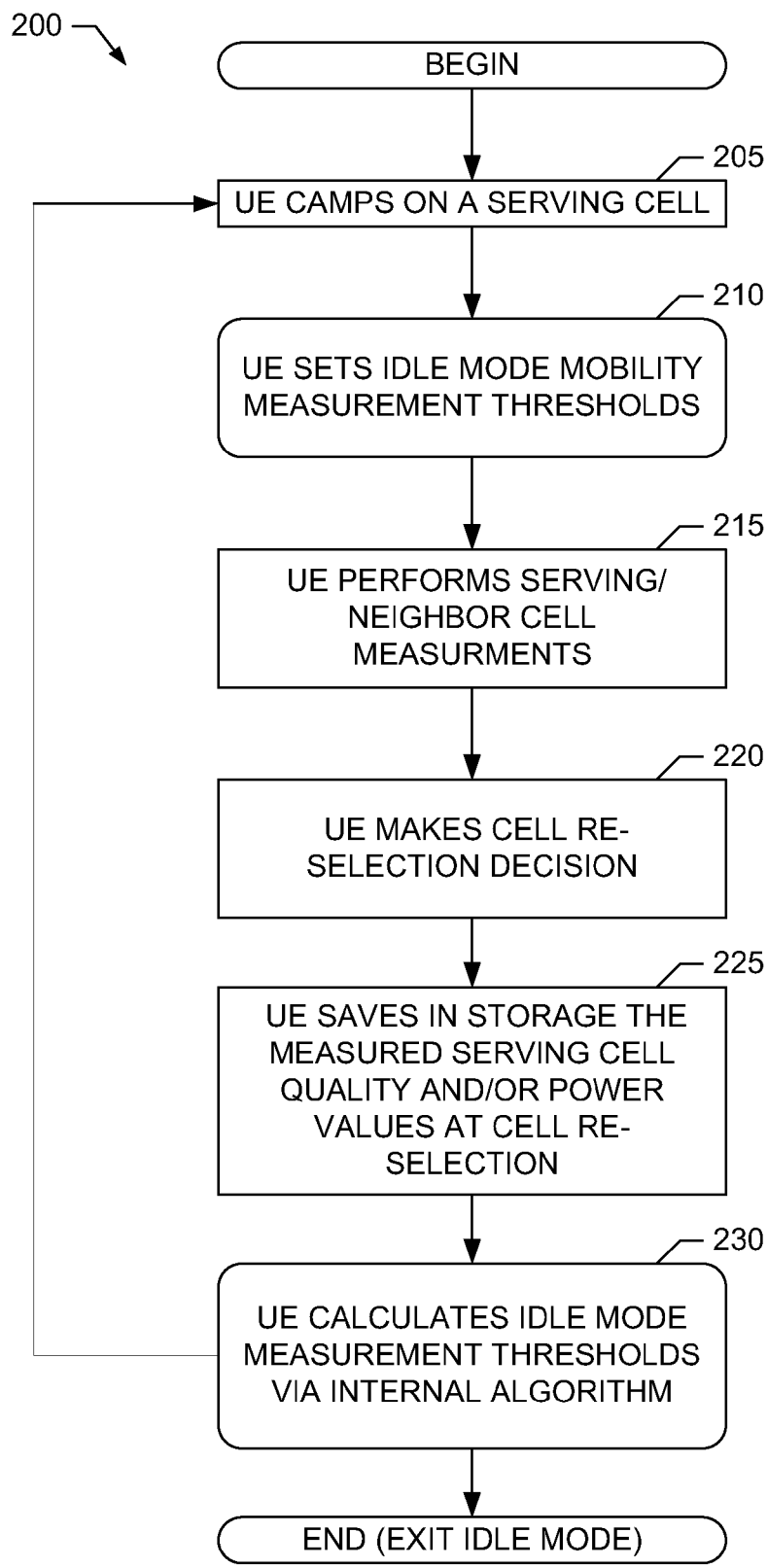
FIG. 2 is a flowchart representative of an example process that may be performed to implement the example UE idle mode mobility measurements.
Figure 3A:
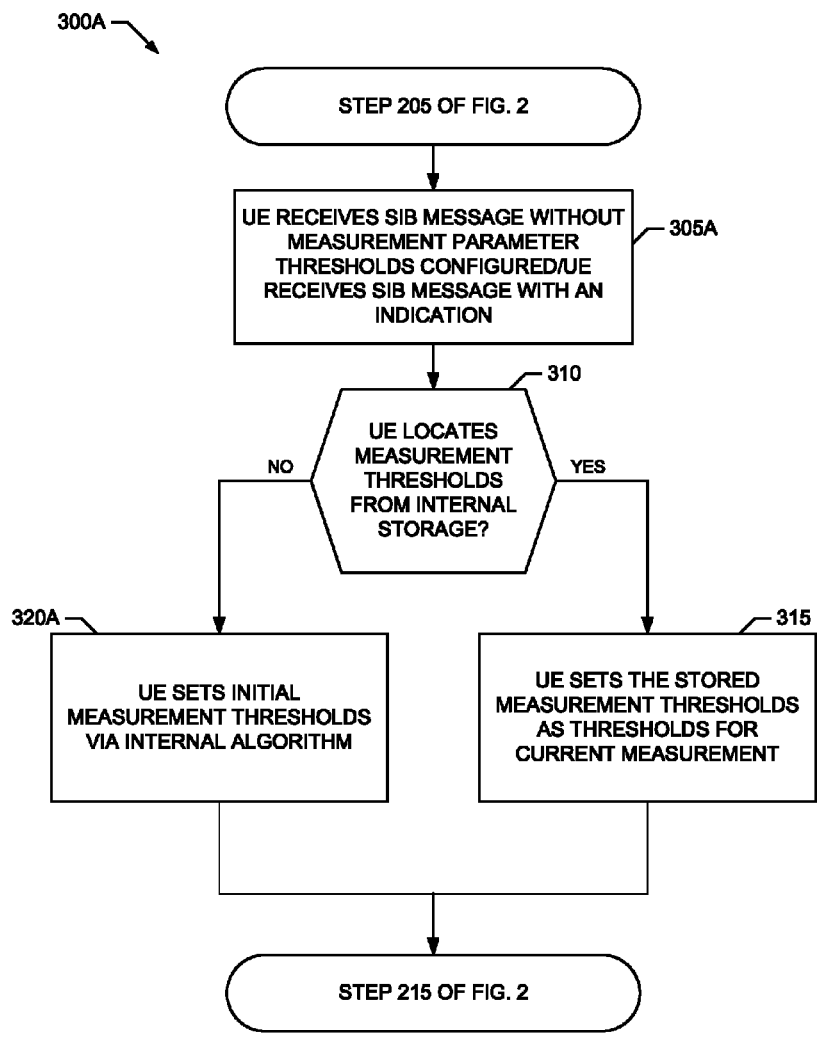
FIG. 3A is a flowchart representative of an example process that may be performed to implement the example UE idle mode mobility measurements.
Figure 3B:
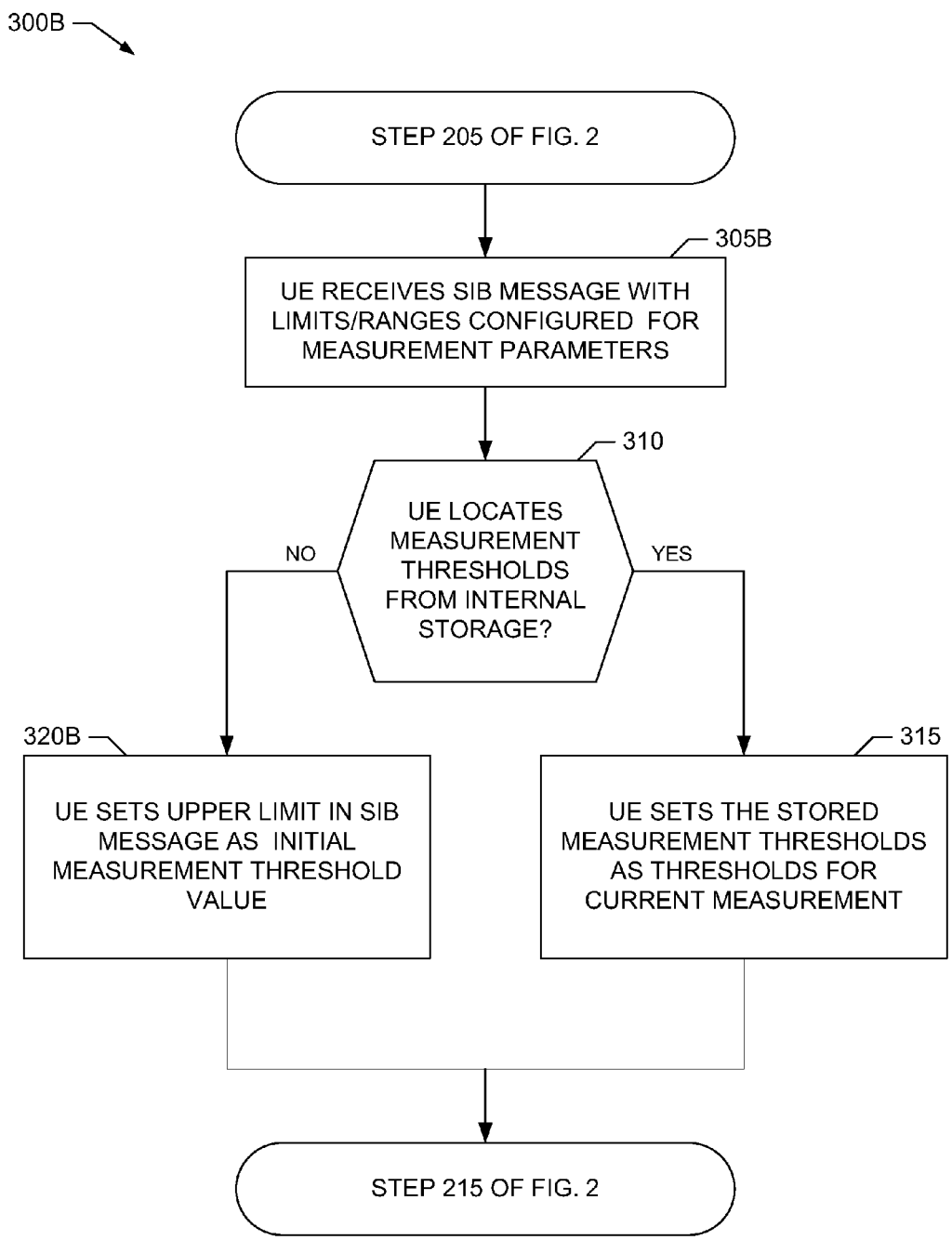
FIG. 3B is a flowchart representative of an example process that may be performed to implement the example UE idle mode mobility measurements.

FIGS. 2, 3A and 3B illustrate flowchart representative of example processes that may be executed to perform idle mode neighbor cell measurement and cell re-selection operations according to the current invention. In these examples, the process represented by each flowchart may be implemented by one or more programs comprising machine readable instructions for execution by a processor, such as the processor 712 shown in the example processing system 700 discussed below in connection with FIG. 7. Alternatively, the entire program or programs and/or portions thereof implementing one or more of the processes represented by the flowcharts of FIGS. 2, 3A and 3B could be executed by a device other than the processor 712 (e.g., such as a controller and/or any other suitable device) and/or embodied in firmware or dedicated hardware (e.g., implemented by an ASIC, a PLD, a CPLD, an FPLD, an FPGA, discrete logic, etc.). Also, one or more of the processes represented by the flowchart of FIGS. 2, 3A and 3B, or one or more portion(s) thereof, may be implemented manually. Further, although the example processes are described with reference to the flowcharts illustrated in FIGS. 2, 3A and 3B, many other techniques for implementing the example methods and apparatus described herein may alternatively be used. For example, with reference to the flowcharts illustrated in FIGS. 2, 3A and 3B, the order of execution of the blocks may be changed, and/or some of the blocks described may be changed, eliminated, combined and/or subdivided into multiple blocks.

As mentioned above, the example processes of FIGS. 2, 3A and 3B may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 2, 3A and 3B may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, in the context of the current invention disclosure, as used herein, the terms "computer readable" and "machine readable" are considered technically equivalent unless indicated otherwise.

FIG. 2 illustrates example process 200 that may be executed to implement the example idle mode mobility measurements on serving and neighbor cells and cell re-selection operation according to the current invention. FIG. 2 begins execution at block 205 at which an example UE has registered to an example mobile communication network, such as a public land mobile network (PLMN), and has camped on a serving cell for mobile communication service. The PLMN may be an existing or future mobile network that is compliant with the Third Generation Partnership Project (3GPP) specifications. In one example, the cell the UE camps on may be a GERAN cell corresponding to the second generation GSM mobile communication network or, more generally, a 2G cell. In another example, the cell the UE camps on may be a UTRAN cell corresponding to the third generation UMTS mobile communication network or, more generally, a 3G cell. More specifically, the 3G cell may be an UMTS FDD (frequency division duplex) cell or an UMTS TDD cell (time division duplex). In a further example, the cell the UE camps on may be an E-UTRAN cell corresponding to the fourth generation LTE mobile communication network or, more generally, a 4G cell. More specifically, the 4G cell may be an LTE FDD cell or an LTE TDD cell. In an additional example, the cell the UE camps on may be one that corresponds to other 3GPP-compliant mobile networks, such as a TD-SCDMA network or its variants, a TD-LTE network or its variants. In yet another example, the cell the UE camps on may be one that corresponds to a non-3GPP-compliant mobile network, such as a CDMA2000 network or its variants. In above examples, the cell on which the example UEs camp may be a regular 3G or 4G cell (NodeB, eNodeB) or a 3G or 4G femtocell (Home NodeB, Home eNodeB). In the context of an LTE network, an example UE that camps on the serving cell is in E-UTRA RRC Idle mode and is expected to perform neighbor cell measurement and cell re-selection, for example, to maintain its radio attachment to the core network (i.e., EPC) or to update the EPC about its current tracking area. In the context of an UMTS network, an example UE that camps on the serving cell may be in idle state or one of the less active states of URA_PCH, CELL_PCH, or CELL_FACH, and is expected to perform neighbor cell measurement and cell re-selection, for example, to maintain or increase its level of connectivity with the network. To simplify description, the term "idle mode" is generally used to refer to the RRC state on the UE prior to neighbor cell measurement and cell re-selection.

At block 210, the UE sets idle mode mobility measurement thresholds by either retrieving existing thresholds previously configured by UE and stored in a UE measurement system or by configuring thresholds via executing one or more processes locally inside the UE measurement system. An example UE measurement system 505 is illustrated below in connection with FIG. 5. The UE-configured mobility measurement thresholds may be of any existing or new parameters used for idle mode mobility measurements on the serving cell and neighbor cells, such as parameter thresholds "Sintrasearch", "Sintersearch" and "Snonintrasearch" used for UMTS FDD cell re-selection as described previously. Additional example UE-configured mobility measurement parameter thresholds may include intra-frequency cell selection RX level threshold "SintrasearchP" and quality threshold "SintrasearchQ", inter-frequency/inter-RAT cell selection RX level threshold "SnonintrasearchP" and quality threshold "SnonintrasearchQ", although other existing idle mode mobility measurement parameter thresholds are not excluded.

In the context of the current invention disclosure, the term "set" a threshold and "configure" a threshold are considered technically equivalent, and may be interchangeably used to refer to the process to specify an idle mode mobility measurement parameter and assign a threshold value for the idle mode mobility measurement parameter unless indicated otherwise.

At block 215, the UE performs serving cell quality measurement and starts neighbor cell measurements when serving cell quality falls below one or more of the UE-configured neighbor cell measurement thresholds derived from the previous step. The measurements are mainly used to rank the different candidate neighbor cells according to their signal strength or quality for re-selection decisions. In one example, serving cell and neighbor cell quality are accessed via cell power parameters, such as RSCP (Received Signal Code Power) for UMTS FDD cell measurement or RSRP (Reference Signal Received Power) for LTE cell measurement. In another example, serving cell and neighbor cell quality are accessed via cell quality parameters, such as UMTS FDD Ec/No cell measurement described previously with respect to FIG. 1 or RSRQ (Reference Signal Received Quality) for LTE cell measurement. When performing neighbor cell measurements the UE may evaluate any combination of intra-frequency cells, inter-frequency cells and inter-RAT cells according to a pre-defined order of priority. For example, the intra-frequency cell measurements that the UE is expected to perform may include measurements on neighbor cells having the same frequency of the same RAT in which the UE is currently operating. Also, the inter-frequency cell measurements that the UE is expected to perform may include measurements on neighbor cells of one or more other frequencies of the same RAT in which the UE is currently operating. Furthermore, the inter-RAT cell measurements that the UE is expected to perform may include measurements on neighbor cells of one or more other RATs than that the UE is currently operating. At the end of this step, one or more candidate neighbor cells may be identified for idle mode cell re-selection decision. At block 220, the UE compares the candidate neighbor cells on the relevant frequencies based on a pre-defined ranking criterion, such as signal power, signal quality, and cell priority. The UE then makes a decision to perform cell re-selection and camp on a new serving cell.

At block 225, the UE collects the serving cell power parameter value (e.g., RSCP, RSRP) and/or quality parameter value (e.g., Ec/No, RSRQ) at every successful cell re-selection. The collected serving cell power parameter values and cell quality parameter values may include measured power and quality figures at cell re-selections between any combination of intra-frequency cells, inter-frequency cells and inter-RAT cells, The UE then stores the collected serving cell parameter values at cell re-selections in a local storage inside the UE measurement system, such as the example cell measurement subsystem/storage 530 of the example UE measurement system 505 discussed below with respect to FIG. 5. Additionally, for the process at block 225, a serving cell quality parameter value at a successful cell re-selection may be collected and stored in relation to other UE or cell conditions. In an example, a serving cell parameter value at a successful cell re-selection is collected and stored in relation to the corresponding UE mobility states (e.g., high, medium, low).

At block 230, the UE calculates one or more suitable idle mode neighbor cell measurement threshold via internal algorithm (e.g., executing computer readable coded instructions) using the stored serving cell power parameter values and/or cell quality parameter values that are collected at one or more previous cell re-selections and stored in the UE in the previous step. The updated idle mode neighbor cell measurement thresholds obtained from the calculation are then saved in a local storage inside the UE measurement system, such as the example re-selection history subsystem/storage 540 of the example UE measurement system 505 discussed below with respect to FIG. 5. The updated idle mode neighbor cell measurement thresholds derived from block 230 may be used as thresholds for coming neighbor cell measurement. Afterward, the UE camps on the re-selected new serving cell at block 205. The example process 200 of idle mode mobility measurements on serving and neighbor cells and cell re-selection operation ends execution when a UE exits idle mode.

In the current invention, various processes may be employed for the processing at block 230. In one example, power parameter value (e.g., RSCP, RSRP) and/or quality parameter value (e.g., Ec/No, RSRQ) at the latest N cell re-selections (N is integer, ≥1) are retrieved from the UE measurement system. A UE may perform an existing averaging process, such as an arithmetic averaging process on the data saved at block 225 to obtain an average serving cell quality (e.g., power or quality parameter value) at the previous N cell re-selections. The obtained average serving cell quality figure may then be used as thresholds for subsequent neighbor cell measurement. In an example in the context of UMTS network, serving cell quality parameter "Qqualmeas" (Ec/No) from the latest five UMTS FDD cell re-selections are analyzed. A UE retrieves the serving cell "Qqualmeas" values at the latest five intra-frequency cell se-selections from the UE measurement system. The UE executes an internal algorithm to obtain an arithmetic average value of the serving cell "Qqualmeas" at the prior five cell re-selections. The UE then saves the derived average serving cell "Qqualmeas" value as "Sintrasearch_average", which may be used as the threshold for coming intra-frequency neighbor cell measurements. Similarly, the UE may retrieve the serving cell "Qqualmeas" values measured at the latest five inter-frequency cell se-selections from the UE measurement system and then execute an averaging algorithm, such as an arithmetic average, on the data to derive a threshold value (e.g., "Sintersearch_average") for subsequent inter-frequency UMTS FDD neighbor cell measurements.

In an example in the context of an LTE network, a UE may retrieve the serving cell "Qqualmeas" values measured at the latest five inter-frequency or inter-RAT neighbor cell re-selections and execute an averaging algorithm on the data to derive a threshold value (e.g., "Snonintrasearch_average") for subsequent E-UTRAN neighbor cell measurements. Additionally and alternatively, a UE may save the newly-derived neighbor cell measurement thresholds (e.g., "Sintrasearch_average", "Sintersearch_average", "Snonintrasearch_average", "SinterRAT_average", etc.) in their actual figures. A UE may also save the newly-derived inter-frequency thresholds as an offset with respect to one or more other derived measurement threshold values. In an example LTE network, "Snonintrasearch_average", "SinterRAT_average" are derived having an average offset of about 2-3 dBs below "Sintrasearch_average". These offsets are respectively saved in the UE measurement system, such as the example re-selection history subsystem/storage 540 of the example UE measurement system 505 discussed below with respect to FIG. 5.

In another example for the processing at block 230, a UE may perform a weighted averaging process, such as a weighted arithmetic averaging process on the data saved at block 225 to obtain an average serving cell quality (e.g., power or quality parameter value) at the previous N cell re-selections. The obtained average serving cell quality figures from the weighted averaging process may then be used as thresholds for subsequent neighbor cell measurements. In an example in the context of UMTS network, serving cell quality parameter "Qqualmeas" (Ec/No) at the latest five UMTS FDD cell re-selections are analyzed. A UE retrieves the serving cell "Qqualmeas" values at the latest five intra-frequency cell se-selections from the UE measurement system. The UE may subsequently execute a weighted arithmetic averaging process on these data. In an example, the weighted averaging process decides the weight for an individual data according to the time period the UE camped on the corresponding cell. The weighted averaging process places more weight on a cell on which the UE camped longer. In another example, the weighted averaging process arranges the weights for the serving cell "Qqualmeas" data according to the chronological order of the previous cell re-selections counted in the averaging process. The weighted averaging process places most weight on "Qqualmeas" (Ec/No) from the most recent cell re-selection and places least weight on "Qqualmeas" (Ec/No) from the least recent cell re-selection. In further examples, a UE may perform other existing weighted averaging process for the processing at block 230. In additional and alternative examples, a UE may employ other existing statistical analysis processes for the data processing at block 230.

In additional examples for the processing at block 230, the UE may perform statistical analysis processes, such as those describe above, to obtain optimal idle mode mobility measurement parameter thresholds that correspond to various UE or cell conditions. For example, a UE may perform an averaging process on the saved data from step 225 that are collected at prior cell re-selections when the UE was in high mobility state and derive an suitable intra-frequency neighbor cell measurement parameter threshold "Sintrasearch_high", which may be used as threshold for coming neighbor cell measurements when the UE is in high mobility state. Similarly, a UE may derive a suitable intra-frequency neighbor cell measurement parameter threshold "Sintrasearch_medium" and "Sintrasearch_low", which may be used respectively as threshold for coming neighbor cell measurements when the UE is in medium and low mobility state.

It is noted that, when a UE performs the steps in the example process 200 for idle mode neighbor cell measurements, suitable parameter thresholds obtained from executing an iteration of the process flow, such as "Sintrasearch_average", "Sintersearch_average", "Snonintrasearch_average", "SinterRAT_average", "Sintrasearch_high", "Sintrasearch_medium", and "Sintrasearch_low" described in above examples, may be continuously updated after each iteration of process 200 of FIG. 2. Preferably, after each cell re-selection, a threshold may be updated at step 230 through the above example statistical analysis processes, taking into account the serving cell and neighbor cell quality at the current cell re-selection. This is at least due to the reason that a suitable threshold, such as "Sintrasearch_average" may vary depending on the network topology and the different cell plannings within the network. Thus, a suitable threshold obtained from the process at block 230 may be different at the different locations of a network. Preferably, a UE could save a suitable threshold value on a per-serving cell basis and/or on a per-neighbor cell basis. In an example, after executing an iteration of process 200 of FIG. 2, an updated threshold value "Sintrasearch_average" overwrites a previously-stored "Sintrasearch_average" value in the UE measurement system; the updated threshold value is used for the next cell re-re-selection operation. As such, a UE may update a neighbor cell measurement threshold dynamically after each cell re-selection.

In the current invention, various processes may be employed for the processing at block 210. Example processes that may implement at least a portion of the processing at blocks 210 are illustrated with respect to FIGS. 3A-3B, which are described in greater detail below.

An example process 300A that may be used to set idle mode mobility measurement thresholds at block 210 of FIG. 2 is illustrated in FIG. 3A. With reference to the preceding figures and associated descriptions, the process 300A of FIG. 3A begins execution at block 305A. In one example, a UE receives a SIB message from the network in which one or more idle mode mobility measurement parameter thresholds are not configured. In another example, a UE receives a SIB message from the network in which one or more idle mode mobility measurement parameters are configured. However, in the current example, the received SIB message includes an indication (e.g., a flag or other predefined variable) that suggests the UE to overlook the SIB-configured thresholds. This may be due to a result of the network determining that a UE-configured threshold may not have a significant impact to the average serving cell quality. In an additional example, a UE receives a SIB message from the network in which one or more idle mode mobility measurement parameter thresholds are not configured. Instead, the SIB message sets one or more allowed maximum threshold values corresponding to one or more idle mode mobility measurement parameters. For instance, a SIB message sets an allowed maximum threshold value "Sintrasearch_max" for intra-frequency cell re-selection measurement. In a further example, a UE receives a SIB message from the network in which one or more idle mode mobility measurement parameter thresholds are not configured. Instead, a set of limits and/or ranges of the parameter thresholds are configured in the SIB message. In an even further example, a UE receives a SIB message from the network in which one or more idle mode mobility measurement parameters are configured. But, the UE may choose to ignore the threshold values configured by the network for at least the reason that the UE desires a full flexibility in cell re-selection operation with little control from the network. In each one of the above scenarios. The UE reads the SIB message and stores the SIB message in a local storage inside the UE measurement system, such as the example system information (SIB) subsystem/storage 520 of the example UE measurement system 505 discussed below with respect to FIG. 5. The UE is expected to determine one or more suitable idle mode neighbor cell measurement parameter thresholds through one or more internal algorithms (e.g., executing computer readable coded instructions).

At block 310, the UE may determine whether the corresponding thresholds can be located from a local storage inside the UE measurement system, such as the example re-selection history subsystem/storage 540 of the example UE measurement system 505 discussed below with respect to FIG. 5. An example idle mode mobility measurement parameter may be a neighbor cell measurement threshold, such as an UTRA FDD intra-frequency neighbor cell measurement threshold "Sintrasearch_average" derived from the calculating process 230 described above with respect to FIG. 2. If the corresponding neighbor cell measurement thresholds are located from the local storage, then at block 315 the UE retrieves and sets the stored measurement thresholds as thresholds for current neighbor cell measurement. The UE then proceeds with step 215 of FIG. 2. However, if one or more corresponding neighbor cell measurement thresholds are not located from the local storage in the UE measurement system or not desired by the UE, then at block 320A, the UE may use an initial threshold for the corresponding neighbor cell measurement parameter and proceed with step 215 of process 200 in FIG. 2 until a more suitable threshold value is configured from step 230. In one example, if certain idle mode neighbor cell measurement parameter threshold, such as "Sintrasearch" is not configured in the SIB message, the UE may pick an allowed maximum value "Sintrasearch_max" as the initial threshold of "Sintrasearch" and proceed with the idle mode mobility measurement process 200 in FIG. 2 until the UE adapts to a more suitable threshold value Sintrasearch_average" derived from step 230 in FIG. 2. In an existing network, a maximum possible value, such as Sintrasearch_max", that may be used as the initial threshold for an idle mode mobility measurement parameter may depend upon the network configuration. In an example, a maximum possible value, such as "Sintrasearch_max", of an idle mode mobility measurement parameter may be provided by the network in a SIB message to UEs to the tracking area level or to per cell basis.

An example process 300B that may be used to set idle mode mobility measurement thresholds at block 210 of FIG. 2 is illustrated in FIG. 3B. With reference to the preceding figures and associated descriptions, the process 300B of FIG. 3B begins execution at 305B. A UE receives a SIB message from the network in which one or more idle mode mobility measurement parameter thresholds are not configured. Instead, a set of limits and/or ranges of the parameter thresholds of idle mode mobility measurement parameters are set in the SIB message. In an example, a network-broadcasted SIB message provides allowed ranges for intra-frequency measurement parameter "Sintrasearch" for UEs having different mobility states. At step 310, a UE in a high mobility state (e.g., user is driving) determines whether a suitable parameter threshold "Sintrasearch_high" can be located from a local storage. If the "Sintrasearch_high" is located from the local storage, then at block 315 the UE retrieves and sets "Sintrasearch_high" as the threshold for current intra-frequency neighbor cell measurement. The UE then proceeds with step 215 of FIG. 2. Similarly, a UE in medium mobility state or in low mobility state may retrieve saved suitable intra-frequency neighbor cell measurement parameter thresholds "Sintrasearch_medium" and "Sintrasearch_low" from the local storage and sets "Sintrasearch_medium" and "Sintrasearch_low" for the current neighbor cell measurements, respectively.

However, if the one or more suitable neighbor cell measurement parameter thresholds derived from previous cell re-selections are not located from the local storage in the UE measurement system, then at block 320B, the UE may use the upper limit value of the SIB-set range as an initial threshold for the corresponding neighbor cell measurement parameter, and proceed with step 215 of process 200 in FIG. 2. In one example, a range is set in a SIB message for "Sintrasearch" that is used for intra-frequency UMTS FDD neighbor cell measurement. The range sets a lower limit "Qqualmin" and an upper limit "Sintrasearch_max" for "Sintrasearch". The lower limit "Qqualmin" may be the minimum required UTRA FDD cell quality level [dB] defined in the existing 3GPP standard specification 25.304. The upper limit value "Sintrasearch_max" corresponds to the allowed maximum value of "Sintrasearch" configured for a network, as described in the above example corresponding to step 320A of FIG. 3A. The UE may perform UMTS FDD intra-frequency neighbor cell measurements using "Sintrasearch_max" as the threshold for a first plurality of cell re-selections. When a more suitable threshold value is derived from executing process 200 of FIG. 2 on the first plurality of cell re-selections, the UE may then switch to the updated threshold value for coming cell re-selections. In another example, a UE may start UMTS FDD intra-frequency neighbor cell measurement using "Sintrasearch_max" as an initial threshold for at least one or more cell re-selections. The UE may then continue its intra-frequency neighbor cell measurements using a "Sintrasearch" of a reduced power level [dB] for the subsequent one or more cell re-selections. In the example, after an initial threshold, such as "Sintrasearch_max" is used, the UE may reiterate process 200 with a predetermined fixed decrement (e.g., a decrement of 2 dB) or non-fixed decrement for subsequent cell re-selections until an updated and more suitable threshold value "Sintrasearch_average" is derived from executing process 200 of FIG. 2. Further in this example, the UE sets "Sintrasearch_max" to be zero if it is assigned as a negative value in a SIB message. Once a more suitable threshold "Sintrasearch_average" is derived, an UE may continue the iterative process 200 of FIG. 2 with dynamically-updated thresholds for the coming cell re-re-selection operations, as explained earlier.

Figure 4:
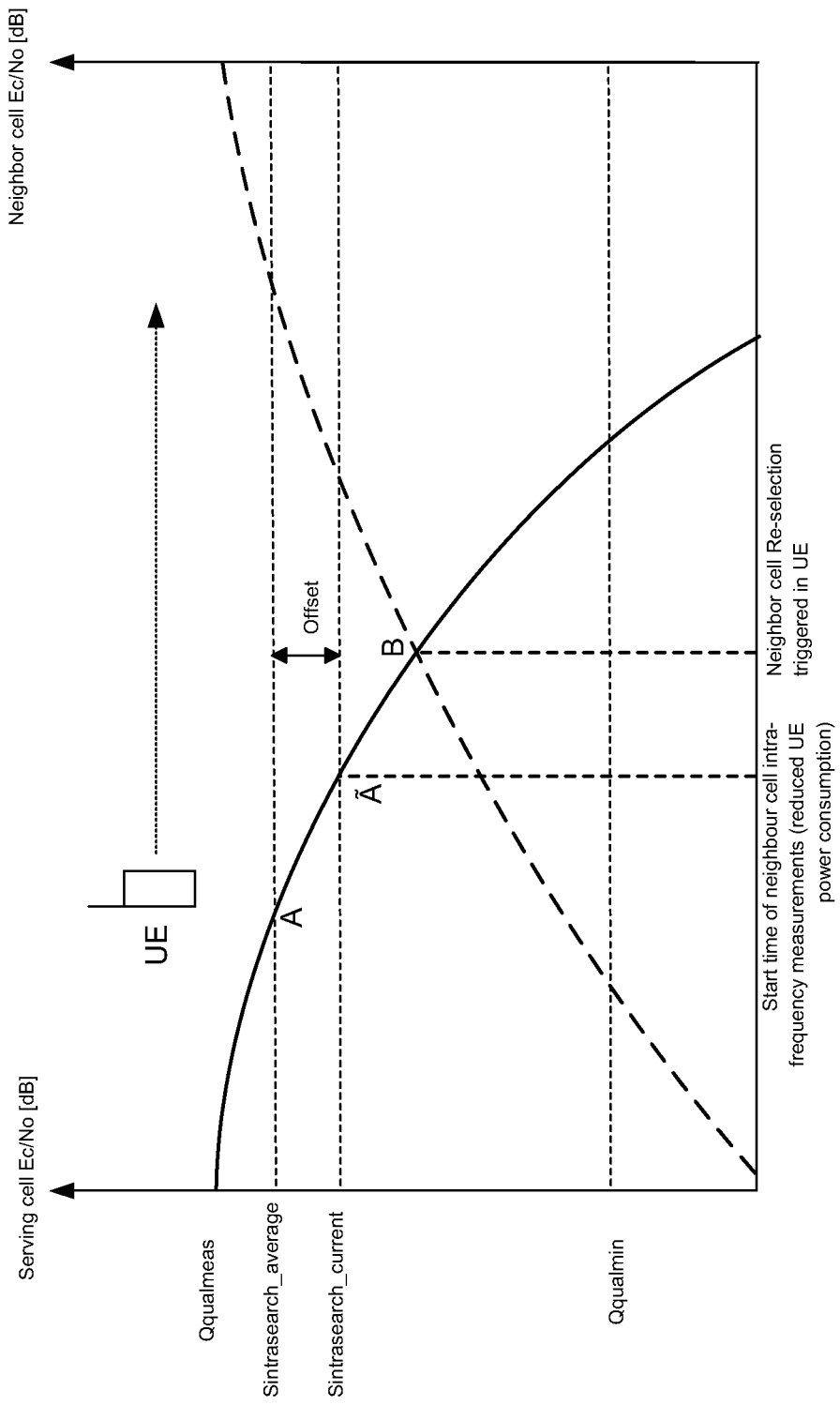
FIG. 4 illustrates an example UE idle mode neighbor cell measurement and the corresponding measurement parameters.

Returning to FIG. 2, another process may be employed to perform step 210 in setting the measurement thresholds for neighbor cell re-selection. With reference to the preceding figures and associated descriptions, the process 210 begins after a suitable threshold value for a corresponding idle mode mobility measurement parameter is derived from prior cell re-selections data and saved in the UE measurement system at step 230 from an earlier iteration of process 200. In an example illustrated in connection to FIG. 4, a UE retrieves an existing updated intra-frequency measurement threshold "Sintrasearch_average" from the UE measurement system. The UE then adds an offset value [dB] on an retrieved existing threshold and sets the summation as the threshold for current cell re-selection operation according to the following formula:

Sintrasearch_current=Sintrasearch_average+Offset [dB].

A UE may perform the above practice of process 210 for a cell re-selection operation based on various conditions. In the example illustrated with respect to FIG. 4, when camped on a serving cell with strong average serving quality, a UE may set a negative offset to lower the threshold of "Sintrasearch" so that neighbor cell measurement begins at point "A" when the serving cell quality is below "Sintrasearch_current". As a result, the UE may reduce battery power consumption by neighbor cell measurement activities. On the other hand, a UE may set a positive offset to increase the threshold of "Sintrasearch" in a serving cell with poor average serving quality in an effort to avoid being unreachable for paging (UE going out of service). Depending on network topology and cell planning, a UE may set a fixed offset value for cells in a particular service region, for example. A UE may also vary the offset setting to cells at tracking area level or to per cell basis, for example. Additionally and alternatively, a UE may set an offset value for a current cell re-selection operation based on other conditions, such as its current preference, its current user behavior, its current mobility state (low/medium/high), cell interference level or cell traffic load change and the like.

After an updated UE idle mode neighbor cell re-selection measurement parameter threshold, such as "Sintrasearch_average", is derived from the one or more example processes illustrated above with respect to FIGS. 2, 3A and 3B, an example intra-frequency cell re-selection decision at step 220 may be made according to a criterion as the following:

If Squal>Sintrasearch_average, UE may choose to not perform intra-frequency measurements.

If Squal<=Sintrasearch_average, perform intra-frequency measurements.

If Sintrasearch_average is not retrieved from the UE measurement system for serving cell, perform intra-frequency measurements.

Where:

Squal [dB]=Qqualmeas−Qqualmin;

Qqualmeas—Measured cell quality value expressed in CPICH Ec/No [dB], as described above;

Qqualmin—Minimum required quality level in the serving cell and candidate neighbor cell [dB], and Sintrasearch_average—updated threshold for intra-frequency neighbor cell measurement, which is derived through example processes illustrated above.

Figure 5:
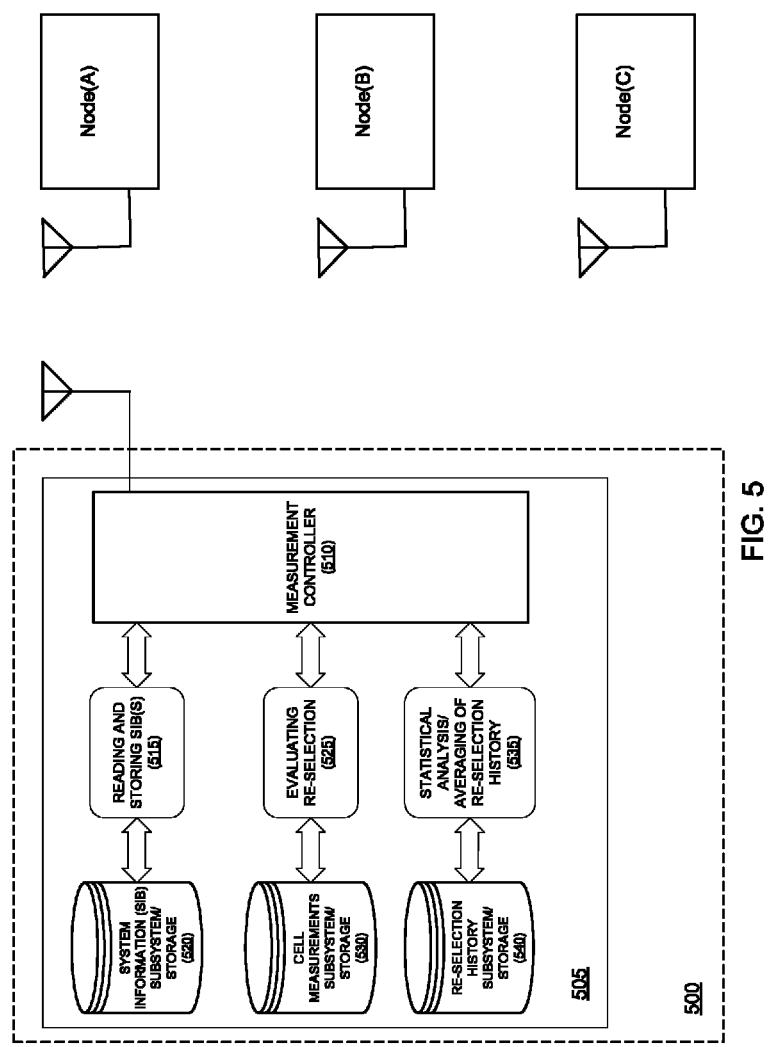
FIG. 5 is a block diagram of at least a portion of the example UE that can be used to implement the example UE idle mode mobility measurements.

FIG. 5 illustrates an example implementation of a UE 500 that supports idle mode neighbor cell measurements and cell re-selection operations as disclosed above. UE 500 comprises a UE measurement system 505 that may be implemented in any type of UE or mobile station or, more generally, any type of wireless communication device, such as a smartphone, a tablet computer, a mobile telephone device that is portable, a mobile computing device that is portable, a mobile telephone device implementing a stationary telephone, a personal digital assistant (PDA), etc. As discussed previously, prior UEs may implement existing idle mode mobility measurements and neighbor cell re-selection operations in which measurement thresholds are statically configured in a SIB message broadcasted from the network. Unlike such prior UEs, the UE 500 of the illustrated example implements one or more example idle mode mobility measurement techniques, and/or combinations thereof, that applies, at least in part, UE-configured parameter thresholds for which neighbor cell measurement is to be performed. Furthermore, the UE-configured parameter thresholds may be dynamically updated to provide a better suitable parameter threshold for idle mode mobility measurement in a serving cell.

For example, to implement idle mode mobility measurements as disclosed above, the UE 500 illustrated in the example of FIG. 5 includes an example UE measurement system 505. The UE 500 is configured to communicate with one or more base stations, such as Node (A), Node (B) and Node (C) in a PLMN network. In an example, the UE measurement system 505 includes an example measurement controller 510, which may be configured to receive SIB messages from Node (A) of its serving cell. In another example, a measurement information receiver (not shown) may be implemented in the measurement controller 510 by any type of receiver capable of receiving and decoding broadcast and/or dedicated signaling messages conveying the list(s) specifying the set of one or more frequencies for which measurements for UE-controlled cell re-selection is to be performed. For example, measurement controller 510 can correspond to any implementation capable of receiving and decoding broadcast UTRAN SIB messages (e.g., Type 3, 4, 11, 11bis, 12 and/or 19 messages), broadcast GERAN SI messages (e.g., SI-2 quarter messages), dedicated UTRAN MOBILITY INFORMATION messages, GERAN Measurement Information and/or GERAN Packet Measurement Order messages, etc. The SIB messages UE 500 received from the network nodes, such as base station Node (A) may include measurement configuration information, such as one or more neighbor cell list(s), specifying one or more frequencies of neighbor cells for which a mobile network expects idle mode measurements to be performed. The received measurement configuration information in the SIB messages may also include configured measurement thresholds from the network, such as one or more minimal required cell quality values, and/or one or more allowed maximum threshold values, and/or one or more sets of limits and/or ranges of the parameter thresholds that correspond to one or more idle mode mobility measurement parameters. The received measurement configuration information may further include an indication (e.g., a flag or other predefined variable) that instructs the UE 500 to derive desired measurement thresholds through internal algorithms.

The example UE measurement system 505 illustrated in FIG. 5 also includes an example reading and storing SIB(S) module 515 that reads the SIB messages received and processed by measurement controller 510 and saves the SIB messages in system information (SIB) subsystem/storage 520. The system information (SIB) subsystem/storage 520 can store the measurement configuration information obtained from the network in any appropriate data format. The UE measurement system 505 illustrated in FIG. 5 also includes example evaluating re-selection module 525 that collects the serving cell power parameter value (e.g., RSCP, RSRP) and/or quality parameter value (e.g., Ec/No, RSRQ) measured at every successful cell re-selection, and then stores the re-selection history data (i.e., the collected serving cell power/quality parameters) in cell measurement subsystem/storage 530. The UE measurement system 505 illustrated in FIG. 5 further includes example statistical analysis module 535 that performs statistical analysis, such as arithmetic averaging and weighted arithmetic averaging, on re-selection history data stored in cell measurement subsystem/storage 530, and stores the results (e.g., average measurement threshold from prior cell re-selections) in re-selection history subsystem/storage 540.

Figure 6:
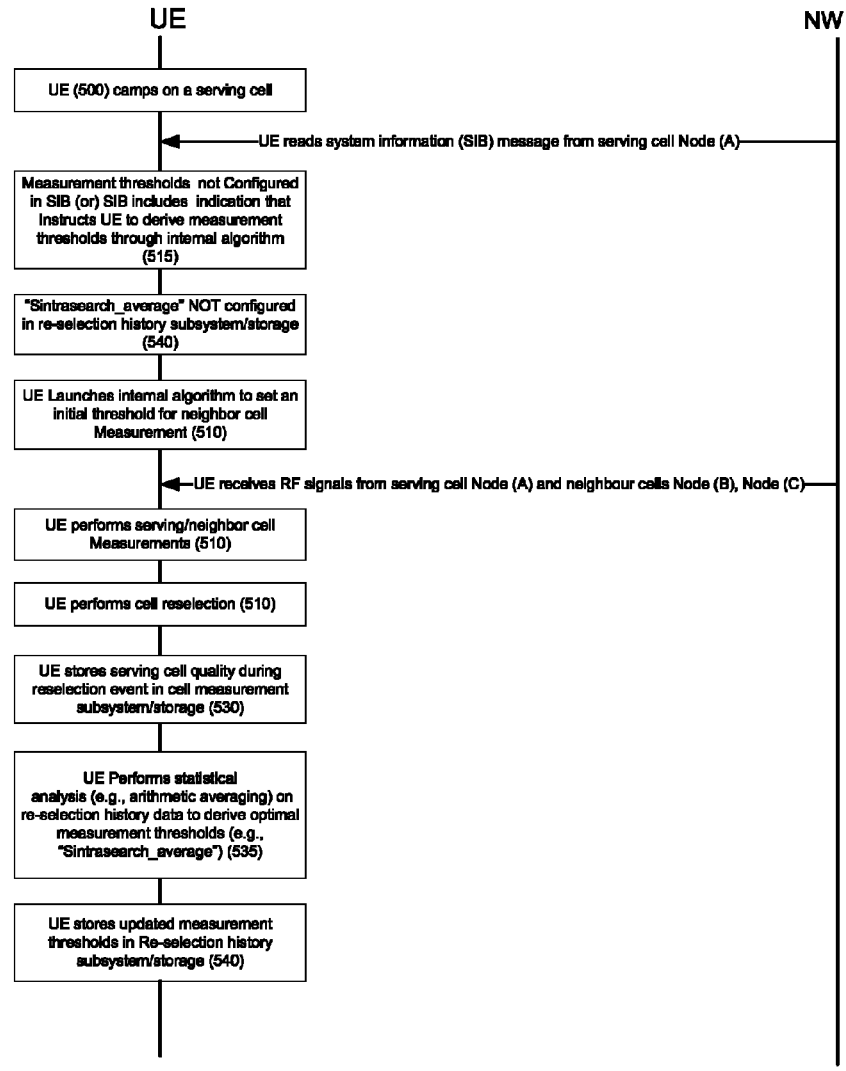
FIG. 6 is a message sequence chart representative that may be performed to implement the example UE idle mode mobility measurements.

The example implementation of the UE measurement system 505 of UE 500 is further illustrated in FIG. 5 along with the message sequence chart in FIG. 6. A UE 500 has registered to a PLMN network and camped on a serving cell, such as Node(A). The user-plane connectivity is not established; UE 500 is in idle mode. UE 500 receives a SIB message from its current serving cell Node(A) and identifies that idle mode mobility measurement thresholds (e.g., Sintrasearch) are either not configured in the SIB message or the received SIB message includes an indication that instructs the UE to derive measurement thresholds through internal algorithms by executing one or more coded instructions embedded in UE measurement system 505, for example. The received SIB message may also include one or more minimal required cell quality values, and/or one or more allowed maximum threshold values, and/or one or more sets of limits and/or ranges of the parameter thresholds that correspond to one or more idle mode mobility measurement parameters. Measurement controller 510 may then save the SIB message in system information (SIB) subsystem/storage 520 via the reading and storing module 515. Measurement controller 510 may then locate and retrieve in the re-selection history subsystem/storage 540 one or more desired measurement thresholds derived from prior cell re-selections (e.g., Sintrasearch_average). If the one or more measurement thresholds are not located at re-selection history subsystem/storage 540, the measurement controller 510 may set an initial measurement threshold through an internal algorithm by executing an embedded coded instruction. In an example, UE 500 launches an internal algorithm in measurement controller 510 to retrieve an allowed maximum threshold (e.g., "Sintrasearch_max") stored in system information (SIB) subsystem/storage 520 and sets the allowed maximum threshold as the initial threshold used for current neighbor cell measurement. UE 500 in idle mode periodically receives RF (radio frequency) signals from the serving cell Node (A) and neighbor cells, such as Node(B) and Node (C) as illustrated in FIG. 5. Measurement controller 510 launches neighbor cell measurement when certain cell quality parameter of the serving cell is below or equal to the set initial threshold. UE 500 measures cell quality (e.g., signal power parameters RSCP, RSRP, or signal quality parameters Ec/No, RSRQ) on the serving cell and neighbor cells. UE 500 compares the candidate neighbor cells on the relevant frequencies based on a pre-defined ranking criterion, such as signal power, signal quality, and cell priority. UE 500 then makes a decision to perform cell re-selection and camp on a new serving cell. Evaluating re-selection module 525 collects the measured serving cell quality parameters at every successful cell re-selection, and then stores the re-selection history data (i.e., the collected serving cell quality parameters) in cell measurement subsystem/storage 530. Measurement controller 510 may subsequently launch internal algorithm at statistical analysis module 535 to perform statistical analysis, such as arithmetic averaging and weighed arithmetic averaging, on re-selection history data stored in cell measurement subsystem/storage 530, and then stores the results (e.g., average measurement threshold from prior cell re-selections) in re-selection history subsystem/storage 540.

While example manners of implementing UE 500 has been illustrated in FIG. 5, one or more of the modules, elements, processes and/or devices illustrated in FIG. 5 may be combined, divided, re-arranged, omitted, eliminated and/or implemented in any other way. Further, the example measurement controller 510, the example reading and storing SIB(S) module 515, the system information (SIB) subsystem/storage 520, the evaluating re-selection module 525, the example cell measurements subsystem/storage 530, the example statistical analysis/averaging of re-selection history module 535, the example re-selection history subsystem/storage 540, the example network elements Node (A), Node (B) and Node (C) may be implemented by hardware, software, firmware and/or any combination of hardware, software and/or firmware. Thus, for example, any of the example measurement controller 510, the example reading and storing SIB(S) module 515, the system information (SIB) subsystem/storage 520, the evaluating re-selection module 525, the example cell measurements subsystem/storage 530, the example statistical analysis/averaging of re-selection history module 535, the example re-selection history subsystem/storage 540, the example network elements Node (A), Node (B) and Node (C) could be implemented by one or more circuit(s), programmable processor(s), application specific integrated circuit(s) (ASIC(s)), programmable logic device(s) (PLD(s)), field programmable logic device(s) (FPLD(s)), complex programmable logic device(s) (CPLD(s)), and/or field-programmable gate array(s) (FPGA(s)), etc. In at least some example implementations, at least one of the example measurement controller 510, the example reading and storing SIB(S) module 515, the system information (SIB) subsystem/storage 520, the evaluating re-selection module 525, the example cell measurements subsystem/storage 530, the example statistical analysis/averaging of re-selection history module 535, the example re-selection history subsystem/storage 540, the example network elements Node (A), Node (B) and Node (C) are hereby expressly defined to include a tangible computer readable medium such as a memory, digital versatile disk (DVD), compact disk (CD), etc., storing such software and/or firmware.

In one example, measurement controller 510, the reading and storing module 515, the evaluating re-selection module 525, and the statistical analysis module 535 are implemented separately as individual processing modules by a known data processing technique, such as the processor 712 of the processing system 700 illustrated in FIG. 7, which is described in greater detail below. In another example, the reading and storing module 515, the evaluating re-selection module 525, and the statistical analysis module 535 may be respectively implemented as a sub-module of measurement controller 510. In a further example, the features of the reading and storing module 515, the evaluating re-selection module 525, and the statistical analysis module 535 are incorporated into a single processing device that is similar to processor 712 of the processing system 700 illustrated in FIG. 7. In one example, the reading and storing module 515, the evaluating re-selection module 525, and the statistical analysis module 535 are "soft" modules that are implemented by executing coded instructions (e.g., computer readable instructions) embodied in a firmware or stored as computer executable instructions on a tangible computer readable medium such as a hard disk drive, a flash memory, a read-only memory (ROM), a CD, a DVD, a cache, a random-access memory (RAM) and/or any other storage media. In another example, the reading and storing module 515, the evaluating re-selection module 525, and the statistical analysis module 535 are "hard" modules that are implemented as a dedicated hardware device, such as an ASIC, a PLD, a CPLD, an FPLD, an FPGA, discrete logic, etc.

Similarly, the system information (SIB) subsystem/storage 520, the cell measurement subsystem/storage 530, and the re-selection history subsystem/storage 540 can be implemented separately as individual storage modules implemented by any type and/or combination of memory and/or storage technology, such as the volatile memory 717 and/or the mass storage device 730 of the processing system 700 illustrated in FIG. 7, which is described in greater detail below. Additionally, the system information (SIB) subsystem/storage 520, the cell measurement subsystem/storage 530, and the re-selection history subsystem/storage 540 can be implemented as subsystems of a mass storage device, such as the mass storage device 730 of the processing system 700 illustrated in FIG. 7. Additionally and alternatively, the reading and storing module 515, the evaluating re-selection module 525, and the statistical analysis module 535, the system information (SIB) subsystem/storage 520, the cell measurement subsystem/storage 530, and the re-selection history subsystem/storage 540 can be incorporated with measurement controller 510 into a single processing device that is similar to processor 712 of the processing system 700 illustrated in FIG. 7. Further still, the example UE 500 and/or the example network element Node(A), Node(B) and Node(C) may include one or more elements, processes and/or devices in addition to, or instead of, those illustrated in FIG. 5, and/or may include more than one of any or all of the illustrated elements, processes and devices.

Figure 7:
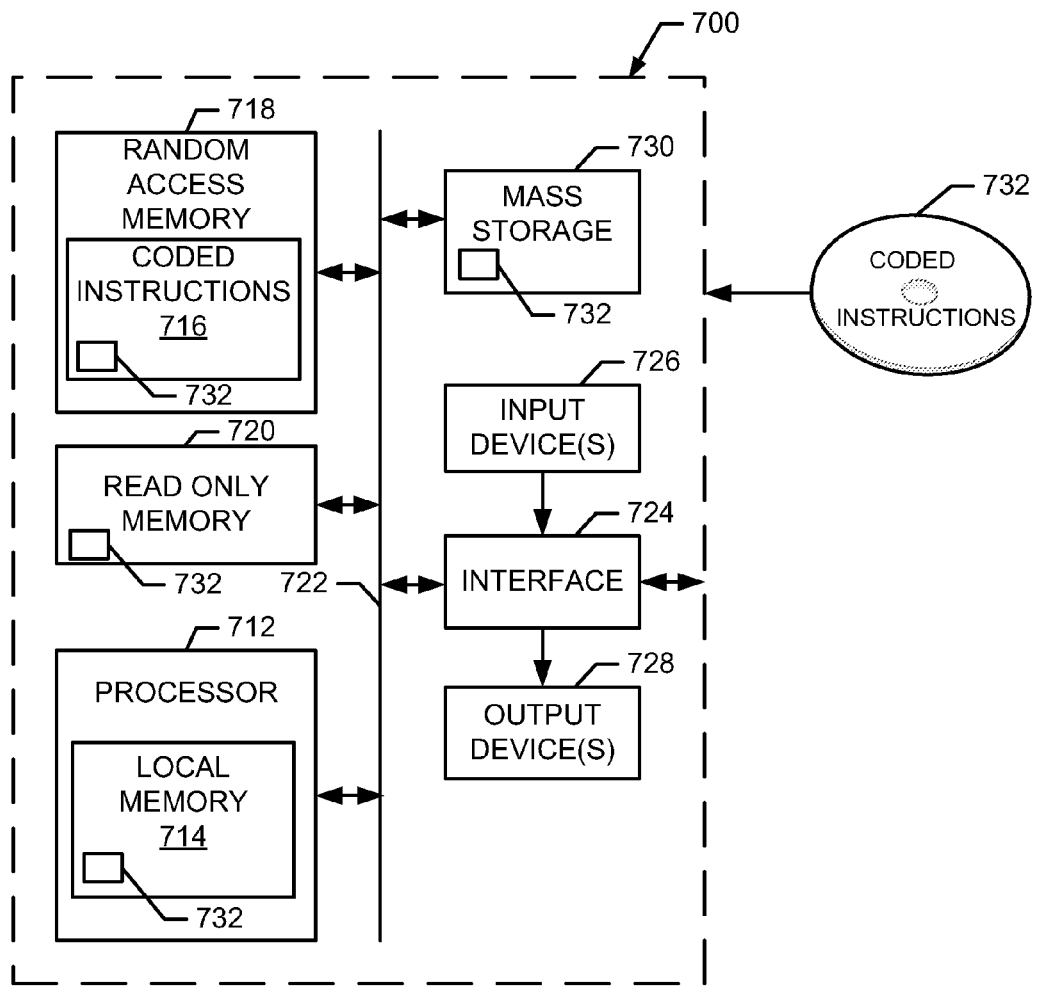
FIG. 7 is a block diagram of an example processing system that may execute example machine readable instructions used to implement one or more of the example UE idle mode mobility measurements.

FIG. 7 is a block diagram of an example processing system 700 capable of implementing the apparatus and methods disclosed herein. The processing system 700 can be, for example, a smartphone, a tablet computer, a mobile phone, a personal digital assistant (PDA), a server, a personal computer, a mobile telephone device that is portable, a mobile computing device that is portable, a network processing element, or any other type of computing device.

The system 700 of the instant example includes a processor 712 such as a general purpose programmable processor. The processor 712 includes a local memory 714, and executes coded instructions 732 present in the local memory 714 and/or in another memory device. The processor 712 may execute, among other things, machine readable instructions to implement the processes represented in FIGS. 2-6. The processor 712 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The processing system 700 also includes an interface circuit 724. The interface circuit 724 may be implemented by any type of interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processor 712. The input device(s) can be implemented by, for example, a keyboard, a mouse, a touch screen, a track-pad, a trackball, an isopoint and/or a voice recognition system.

One or more output devices 728 are also connected to the interface circuit 724. The output devices 728 can be implemented, for example, by display devices (e.g., a liquid crystal display, a cathode ray tube display (CRT)), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 700 also includes one or more mass storage devices 730 for storing machine readable instructions and data. Examples of such mass storage devices 730 include floppy disk drives, hard drive disks, compact disk drives and digital versatile disk (DVD) drives. In some examples, the mass storage device 730 may implement the system information (SIB) subsystem/storage 520, the cell measurement subsystem/storage 530, and the re-selection history subsystem/storage 540. Additionally or alternatively, in some examples the volatile memory 718 may implement the system information (SIB) subsystem/storage 520, the cell measurement subsystem/storage 530, and the re-selection history subsystem/storage 540.

The coded instructions of FIGS. 2-6 may be stored in the mass storage device 730, in the volatile memory 718, in the non-volatile memory 720, in the local memory 714 and/or on a removable storage medium, such as a CD or DVD 732.

As an alternative to implementing the methods and/or apparatus described herein in a system such as the processing system of FIG. 7, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method in a user equipment (UE) in a mobile communication network, the method comprising:
   receiving, from the network, a system information block (SIB) message;
   if a measurement parameter threshold for idle mode mobility measurement is not set by the SIB message or if the SIB message includes an indication to not use a configured measurement parameter threshold in the SIB message, setting an initial measurement parameter threshold for at least one idle mode cell re-selection, wherein the UE performs intra-frequency, inter-frequency, or inter-RAN measurements of neighboring cells when a certain parameter of a serving cell is below or equal to the initial measurement parameter threshold; and
   setting a threshold for the measurement parameter for subsequent idle mode mobility measurements with a predetermined decrement from the initial measurement parameter threshold.

2. The method as defined in claim 1, wherein the SIB message specifies one or more limits or a range for the measurement parameter threshold, and wherein setting the initial measurement parameter threshold for the at least one idle mode cell re-selection includes setting an allowed maximum value of the measurement parameter as the initial measurement parameter threshold.

3. The method as defined in claim 1, wherein setting the initial measurement parameter threshold for the at least one idle mode cell re-selection is performed according to the UE mobility state.

4. The method as defined in claim 1, further comprising:
   ignoring the configured measurement parameter threshold in the SIB message from the network.

5. The method as defined in claim 1, further comprising:
   measuring cell quality parameters on serving cells at the at least one idle mode cell re-selection,
   saving the measured serving cell quality parameters in a local storage, and
   calculating an updated measurement parameter threshold from the saved serving cell quality parameters.

6. The method as defined in claim 5, wherein measuring cell quality parameters on the serving cells at the at least one idle mode cell re-selection includes cell quality parameter expressed in Ec/No [dB] for Universal Mobile Telecommunications System (UMTS) frequency division duplex (FDD) cell measurement or Reference Signal Received Quality (RSRQ) parameter for Long-Term Evolution (LTE) network cell measurement.

7. The method as defined in claim 5, wherein measuring cell quality parameter on the serving cells at the at least one idle mode cell re-selection includes Received Signal Code Power (RSCP) parameter for UMTS FDD cell measurement or Reference Signal Received Power (RSRP) for LTE network cell measurement.

8. The method as defined in claim 5, further comprising:
   setting the updated measurement parameter threshold as the measurement parameter threshold for subsequent idle mode cell re-selection.

9. The method as defined in claim 5, further comprising:
   adding an offset to the updated measurement parameter threshold, and
   setting the summation as the measurement parameter threshold for subsequent idle mode cell re-selection.

10. The method as defined in claim 5, wherein calculating the updated measurement parameter threshold includes a statistical analysis process on the serving cell quality parameters at the at least one idle mode cell re-selection.

11. The method as defined in claim 10, wherein the statistical analysis process is an averaging process on the serving cell quality parameters at the at least one idle mode cell re-selection.

12. The method as defined in claim 10, wherein the statistical analysis process is a weighted averaging process on the serving cell quality parameters at the at least one idle mode cell re-selection, and wherein the weighted averaging process places more weight on a cell on which the UE camped longer.

13. A method in a user equipment (UE) in a mobile communication network, the method comprising:
   measuring cell quality parameters on serving cells at a plurality of idle mode cell re-selections,
   saving the measured serving cell quality parameters in a local storage,
   if a measurement parameter threshold for idle mode mobility measurement is not set by a SIB message or if the SIB message includes an indication to not use a configured measurement parameter threshold in the SIB message, calculating an updated idle mode cell re-selection measurement parameter threshold from the saved serving cell quality parameters, wherein the UE performs intra-frequency, inter-frequency, or inter-RAN measurements of neighboring cells when a certain parameter of a serving cell is below or equal to the updated idle mode cell re-selection measurement parameter threshold,
   adding an offset to the updated measurement parameter threshold, and
   setting the summation as the measurement parameter threshold for subsequent idle mode cell re-selection.

14. The method as defined in claim 13, further comprising:
   setting the updated measurement parameter threshold as the measurement parameter threshold for subsequent idle mode cell re-selection.

15. The method as defined in claim 13, wherein measuring cell quality parameters on the serving cells at the plurality of idle mode cell re-selections includes cell quality parameter expressed in Ec/No [dB] for Universal Mobile Telecommunications System (UMTS) frequency division duplex (FDD) cell measurement or Reference Signal Received Quality (RSRQ) parameter for Long-Term Evolution (LTE) network cell measurement.

16. The method as defined in claim 13, wherein measuring cell quality parameter on the serving cells at the plurality of idle mode cell re-selections includes Received Signal Code Power (RSCP) parameter for UMTS FDD cell measurement or Reference Signal Received Power (RSRP) for LTE network cell measurement.

17. The method as defined in claim 13, wherein calculating the updated measurement parameter threshold includes an averaging process on the measured serving cell quality parameters at the plurality of idle mode cell re-selections.

18. A non-transitory machine readable medium encoded with machine-executable instructions, wherein execution of the machine-executable instructions is for:
   receiving, from a serving cell, a system information block (SIB) message;
   if a measurement parameter threshold for idle mode mobility measurement is not set by the SIB message or if the SIB message includes an indication to not use a configured measurement parameter threshold in the SIB message, setting an initial measurement parameter threshold for at least one idle mode cell re-selection, wherein the UE performs intra-frequency, inter-frequency, or inter-RAN measurements of neighboring cells when a certain parameter of a serving cell is below or equal to the initial measurement parameter threshold; and setting a threshold for the measurement parameter for subsequent idle mode mobility measurements with a predetermined decrement from the initial measurement parameter threshold.

19. The non-transitory machine readable medium as defined in claim 18, wherein the SIB message specifies one or more limits or a range for the measurement parameter threshold, and wherein setting the initial measurement parameter threshold for the at least one idle mode cell re-selection includes setting an allowed maximum value of the measurement parameter as the initial measurement parameter threshold.

20. The non-transitory machine readable medium as defined in claim 18, wherein execution of the machine-executable instructions is further for:
measuring cell quality parameters on serving cells at the at least one idle mode cell re-selection,
saving the measured serving cell quality parameters in a local storage, and
calculating an updated measurement parameter threshold from the saved serving cell quality parameters.

21. The non-transitory machine readable medium as defined in claim 20, wherein execution of the machine-executable instructions is further for:
setting the updated measurement parameter threshold as the measurement parameter threshold for subsequent idle mode cell re-selection.

22. The non-transitory machine readable medium as defined in claim 20, wherein calculating the updated measurement parameter threshold includes an averaging process on the serving cell quality parameters at the at least one idle mode cell re-selection.

23. The non-transitory machine readable medium as defined in claim 20, wherein execution of the machine-executable instructions is further for:
adding an offset to the updated measurement parameter threshold, and
setting the summation as the measurement parameter threshold for subsequent idle mode cell re-selection.

24. A user equipment (UE) in a mobile communication network, the UE comprising:
one or more processors configured to:
measure cell quality parameters on serving cells at a plurality of idle mode cell re-selections,
save the measured serving cell quality parameters,
if a measurement parameter threshold for idle mode mobility measurement is not set by a SIB message or if the SIB message includes an indication to not use a configured measurement parameter threshold in the SIB message, calculate an updated measurement parameter threshold from the saved serving cell quality parameters in the storage, wherein the UE performs intra-frequency, inter-frequency, or inter-RAN measurements of neighboring cells when a certain parameter of a serving cell is below or equal to the updated idle mode cell re-selection measurement parameter threshold,
add an offset to the updated measurement parameter threshold, and
set the summation as the measurement parameter threshold for subsequent idle mode cell re-selection.

25. The mobile station as defined in claim 24, wherein the measured cell quality parameters on the serving cells at the plurality of idle mode cell re-selections include cell quality parameter expressed in Ec/No [dB] for Universal Mobile Telecommunications System (UMTS) frequency division duplex (FDD) cell measurement or Reference Signal Received Quality (RSRQ) parameter for Long-Term Evolution (LTE) network cell measurement.

26. The mobile station as defined in claim 24, wherein the measured cell quality parameters on the serving cells at the plurality of idle mode cell re-selections include Received Signal Code Power (RSCP) parameter for UMTS FDD cell measurement or Reference Signal Received Power (RSRP) for LTE network cell measurement.

27. The mobile station as defined in claim 24, wherein the measurement controller is further configured to read one or more limits or a range for the idle mode cell re-selection measurement parameter thresholds configured in a SIB message from the network and set an allowed maximum value of the measurement parameter as an initial measurement parameter threshold for idle mode cell re-selection measurements.

28. The mobile station as defined in claim 24, wherein calculating the updated measurement parameter threshold includes an averaging process on the measured serving cell quality parameters at the plurality of idle mode cell re-selections.

29. A non-transitory machine readable medium encoded with machine-executable instructions, wherein execution of the machine-executable instructions is for:
receiving, from the network, a system information block (SIB) message; and
if a measurement parameter threshold for idle mode mobility measurement is not set by the SIB message or if the SIB message includes an indication to not use a configured measurement parameter threshold in the SIB message, setting an initial measurement parameter threshold for at least one idle mode cell re-selection, wherein the UE performs intra-frequency, inter-frequency, or inter-RAN measurements of neighboring cells when a certain parameter of a serving cell is below or equal to the initial measurement parameter threshold; and
setting a threshold for the measurement parameter for subsequent idle mode mobility measurements with a predetermined decrement from the initial measurement parameter threshold.

30. A user equipment (UE) in a mobile communication network, the UE comprising:
one or more processors configured to:
receive, from the network, a system information block (SIB) message; and
if a measurement parameter threshold for idle mode mobility measurement is not set by the SIB message or if the SIB message includes an indication to not use a configured measurement parameter threshold in the SIB message, set an initial measurement parameter threshold for at least one idle mode cell re-selection, wherein the UE performs intra-frequency, inter-frequency, or inter-RAN measurements of neighboring cells when a certain parameter of a serving cell is below or equal to the initial measurement parameter threshold; and
set a threshold for the measurement parameter for subsequent idle mode mobility measurements with a predetermined decrement from the initial measurement parameter threshold.

* * * * *

UNITED STATES PATENT AND TRADEMARK OFFICE
CERTIFICATE OF CORRECTION

PATENT NO. : 8,942,205 B2  
APPLICATION NO. : 13/357409  
DATED : January 27, 2015  
INVENTOR(S) : Tomasz Henryk Mach et al.

Page 1 of 1

It is certified that error appears in the above-identified patent and that said Letters Patent is hereby corrected as shown below:

In the Claims

Column 23, line 61, In Claim 25, Delete "mobile station" and insert -- UE --, therefor.

Column 24, line 6, In Claim 26, Delete "mobile station" and insert -- UE --, therefor.

Column 24, line 12, In Claim 27, Delete "mobile station" and insert -- UE --, therefor.

Column 24, line 19, In Claim 28, Delete "mobile station" and insert -- UE --, therefor.

Signed and Sealed this  
Eighteenth Day of August, 2015

Michelle K. Lee  
*Director of the United States Patent and Trademark Office*